United States Patent
Yegani et al.

(10) Patent No.: US 8,347,077 B2
(45) Date of Patent: Jan. 1, 2013

(54) AUTHENTICATING A REGISTRATION REQUEST WITH A MOBILITY KEY PROVIDED TO AN AUTHENTICATOR

(75) Inventors: Parviz Yegani, Danville, CA (US); Jayaraman R. Iyer, Sunnyvale, CA (US); Anand K. Oswal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1410 days.

(21) Appl. No.: 11/381,645

(22) Filed: May 4, 2006

(65) Prior Publication Data

US 2007/0260885 A1 Nov. 8, 2007

(51) Int. Cl.
G06F 7/04 (2006.01)
H04L 29/06 (2006.01)
G06F 15/16 (2006.01)
G06F 17/30 (2006.01)

(52) U.S. Cl. ............ 713/155; 713/170; 380/281; 726/7; 709/225; 709/229; 455/435.1

(58) Field of Classification Search .................. 713/155, 713/170; 726/7; 709/225, 229; 455/435.1
See application file for complete search history.

(56) References Cited

U.S. PATENT DOCUMENTS

| | | | |
|---|---|---|---|
| 6,621,810 B1 * | 9/2003 | Leung | 370/338 |
| 7,580,919 B1 * | 8/2009 | Hannel et al. | 1/1 |
| 2002/0012433 A1 * | 1/2002 | Haverinen et al. | 380/247 |
| 2003/0147537 A1 * | 8/2003 | Jing et al. | 380/277 |
| 2003/0208677 A1 * | 11/2003 | Ayyagari et al. | 713/168 |
| 2004/0073786 A1 * | 4/2004 | O'Neill et al. | 713/155 |
| 2004/0208153 A1 * | 10/2004 | Mizell et al. | 370/338 |
| 2007/0005971 A1 * | 1/2007 | Leung et al. | 713/171 |
| 2007/0016774 A1 * | 1/2007 | Bakshi | 713/168 |
| 2007/0160017 A1 * | 7/2007 | Meier et al. | 370/338 |

OTHER PUBLICATIONS

Lior, A. et al. "Mobile IP Key Derivation using EAP", Feb. 2006, <draft-lior-mipkeys-eap-00>.*
Calhoun, Pat R. et al. "Minimal Latency Secure Hand-off", Feb. 2000.*
Calhoun, Pat R. et al. "Foreign Agent Keys Encoded as Opaque Tokens for use in Hand-off Process", Mar. 2000.*
Perkins, C. "IP Mobility Support for IPv4" (RFC3344), Aug. 2002.*
Glass, S. et al. "Mobile IP Authentication, Authorization, and Accounting Requirements" (RFC2977), Oct. 2000.*
Perkins, C. et al. "Authentication, Authorization, and Accounting (AAA) Registration Keys for Mobile IPv4" (RFC3957), Mar. 2005.*
IEEE. "802.11i, Part 11: Wireless LAN Medium Access Control (MAC) and Physical Layer (PHY) specifications, Amendment 6: Medium Access Control (MAC) Security Enhancements", Jul. 2004.*
Blunk, L., et al., "*PPP Extensible Authentication Protocol (EAP)*", Network Working Group, Request for Comments: 2284, Category: Standards Track, Copyright © The Internet Society (Mar. 1998), http://www.ietf.org/rfc/rfc2284.txt, pp. 1-15.

(Continued)

Primary Examiner — Michael Simitoski
(74) Attorney, Agent, or Firm — Baker Botts L.L.P.

(57) ABSTRACT

Authenticating a registration request from a mobile node includes an authenticator operable to facilitate a communication session for the mobile node. Access authentication to provide the mobile node access to an Internet Protocol (IP) network is facilitated. A mobility key is obtained from the access authentication. A registration request is received from the mobile node, and is authenticated using the mobility key.

9 Claims, 1 Drawing Sheet

OTHER PUBLICATIONS

Perkins, C., et al., "*Mobile IPv4 Challenge/Response Extensions*", Network Working Group, Request for Comments: 3012, Category: Standards Track, Copyright © The Internet Society (Nov. 2000), http://www.rfc-archive.org/getrfc.php?rfc=3012, pp. 1-17.

Perkins, Charles E., et al., "*Generalized Key Distribution Extensions for Mobile IP*", draft-ietf-mobileip-gen-key-01.txt, Mobile IP Working Group, Internet Draft, http://www3.ietf.org/proceedings/01dec/I-D/draft-ietf-mobileip-gen-key-01.txt, pp. 1-9, Aug. 27, 2001.

Perkins, C., "*IP Mobility Support for IPv4*", Network Working Group, Request for Comments: 3344, Obsoletes: 3220, Category: Standards Track, Copyright © The Internet Society (Aug. 2002), http://www.rfc-archive.org/getrfc.php?rfc=3344, pp. 1-93.

Salowey, J., et al., "*Guidelines for using the EAP Extended Master Session Key (EMSK)*", Network Working Group, Internet Draft, Document: draft-salowey-eap-key-deriv-02.txt, http://bgp.potaroo.net/ietf/all-ids/draft-salowey-eap-key-deriv-02.txt, pp. 1-11, Nov. 2003.

"*Extensible Authentication Protocol*", from Wikipedia, the free encyclopedia, http://en.wikipedia.org/wiki/Extensible_Authentication_Protocol, pp. 1-4, Printed Apr. 13, 2006.

\* cited by examiner

US 8,347,077 B2

AUTHENTICATING A REGISTRATION REQUEST WITH A MOBILITY KEY PROVIDED TO AN AUTHENTICATOR

TECHNICAL FIELD

This invention relates generally to the field of communications and more specifically to authenticating a registration request with a mobility key provided to an authenticator.

BACKGROUND

A communication network typically authenticates a registration request from a mobile node before allowing the mobile node to register with the network. As an example, an Internet Protocol (IP) network may authenticate a registration request from a mobile node before allowing the mobile node to register with the IP network. Authentication may involve establishing whether there is a security association between the mobile node and a gateway of the network. The absence of a security association may prohibit the registration request from being authenticated.

According to a known authentication technique, a gateway of a network may perform a challenge procedure with a mobile node. In a challenge procedure, the gateway may send a challenge to the mobile node. If the mobile node fails respond in the appropriate manner, the registration request is not authenticated. These known techniques for authenticating a registration request, however, are not efficient in certain situations. It is generally desirable to efficiently authenticate a registration request in certain situations.

SUMMARY OF THE DISCLOSURE

In accordance with the present invention, disadvantages and problems associated with previous techniques for authenticating a registration request may be reduced or eliminated.

According to one embodiment of the present invention, authenticating a registration request from a mobile node includes an authenticator operable to facilitate a communication session for the mobile node. Access authentication to provide the mobile node access to an Internet Protocol (IP) network is facilitated. A mobility key is obtained from the access authentication. A registration request is received from the mobile node, and is authenticated using the mobility key.

Certain embodiments of the invention may provide one or more technical advantages. A technical advantage of one embodiment may be that a mobility key may be used to authenticate a mobile node and a network, that is, the mobility key may be used to provide mutual authentication. Another technical advantage of one embodiment may be that an authenticator may authenticate a registration request using a mobility key provided to the authenticator. Accordingly, the authenticator need not perform a challenge procedure to authenticate the registration request.

Another technical advantage of one embodiment may be that the authenticator may be associated with a foreign agent. Accordingly, the registration request may be authenticated for a foreign network. Another technical advantage of one embodiment may be that the authenticator may be located at a gateway of an Internet Protocol (IP) network. Accordingly, the registration request may be authenticated for the IP network.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
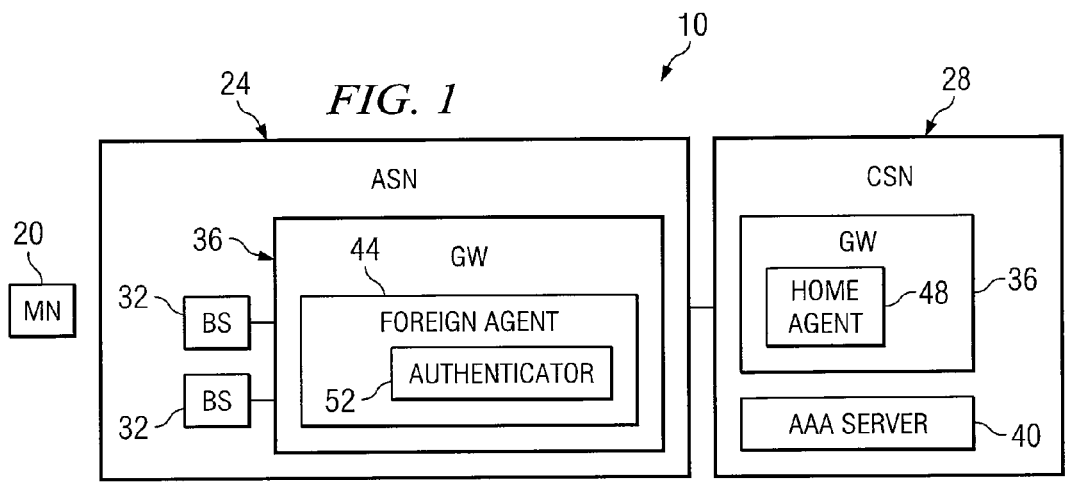
FIG. 1 is a block diagram illustrating one embodiment of a network system for which a registration request from a mobile node may be authenticated.
Figure 2:
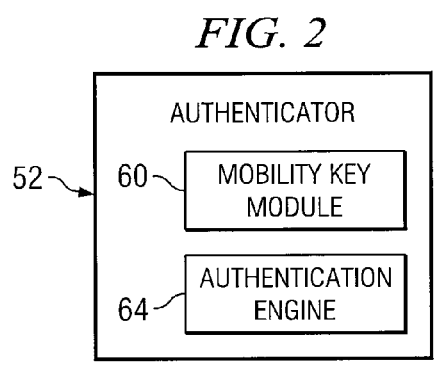
FIG. 2 is a block diagram illustrating one embodiment of an authenticator that may be used with the system of FIG. 1.
Figure 3:
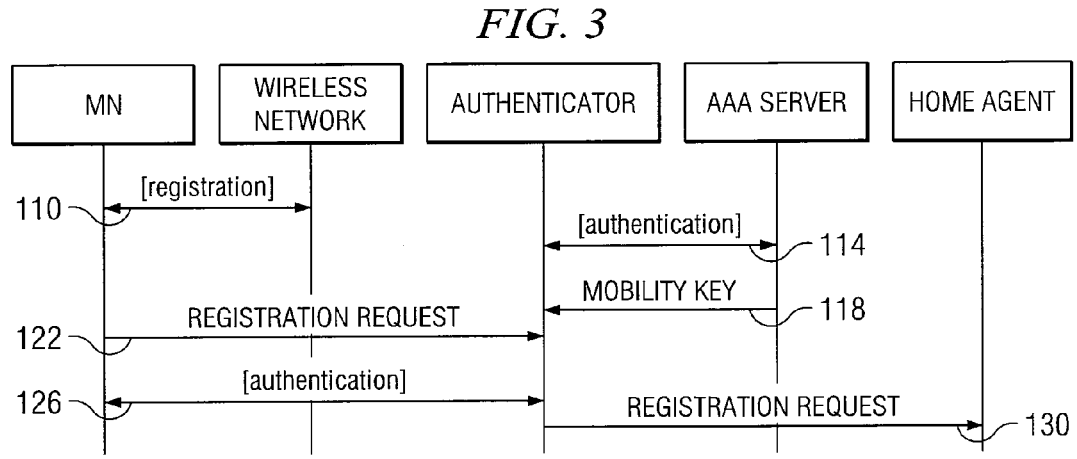
FIG. 3 is a flowchart illustrating one embodiment of a method for authenticating a registration request from a mobile node that may be used with the system of FIG. 1.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a network system 10 for which a registration request from a mobile node may be authenticated. According to the embodiment, an authenticator may authenticate the registration request using a mobility key provided to the authenticator. The authenticator need not perform a challenge procedure to authenticate the registration request. The authenticator may be associated with a foreign agent located at a gateway of an Internet Protocol (IP) network. Accordingly, the registration request may be authenticated for a foreign IP network.

According to the illustrated embodiment, system 10 operates to provide services such as communication sessions to endpoints such as mobile node 20. A communication session may refer to an active communication between mobile nodes, measured from endpoint to endpoint.

Information is communicated during a communication session. Information may refer to voice, data, text, audio, video, multimedia, control, signaling, other information, or any combination of the preceding. System 10 may communicate information in packets. A packet may comprise a bundle of data organized in a specific way for transmission, and a frame may comprise the payload of one or more whole or partial packets organized in a specific way for transmission. A packet-based communication protocol such as Internet Protocol (IP) may be used to communicate the packets.

System 10 may utilize communication protocols and technologies to provide the communication sessions. Example communication protocols and technologies include those set by the Institute of Electrical and Electronics Engineers, Inc. (IEEE) 802.xx standards such as the 802.11 and 802.16 standards (for example, the 802.16e standards), the International Telecommunications Union (ITU-T) standards, the European Telecommunications Standards Institute (ETSI) standards, the Internet Engineering Task Force (IETF) standards, the Third Generation Partnership Project (3GPP2) standards, or other standards.

System 10 includes components such as network devices. In general, a network device may include any suitable arrangement of components operable to perform the operations of the underlying network, and may comprise logic, an interface, memory, other component, or any suitable combination of the preceding.

"Logic" may refer to hardware, software, other logic, or any suitable combination of the preceding that may be used to provide information or instructions. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

System ID may include communication networks. In general, a communication network allows devices to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

According to the illustrated embodiment, system 10 includes one or more mobile nodes 20, one or more access service networks (ASNs) 24, and one or more connectivity service networks (CSNs) 28. An access service network 24 includes one or more base stations 32 and one or more gateways 36, and a connectivity service network 28 includes one or more gateways 36 and an authentication, authorization, and/or accounting (AAA) server 40. A gateway 36 of an access service network 24 includes a foreign agent 44, which may include or be associated with an authenticator 52. A gateway 36 of an connectivity service network 28 includes a home agent 48.

According to the illustrated embodiment, mobile node 20 represents any suitable device operable to communicate with a communication system. Mobile node 20 may comprise, for example, a personal digital assistant, a computer such as a laptop, a cellular telephone, a mobile handset, or any other device operable to communicate with system 10.

Access service network 24 represents a communication network that provides mobile node 20 access to a wired network. Access service network 24 may be provided by a network access provider that provides a radio access infrastructure to one or more network service providers. According to one embodiment, access service network 24 may comprise a WiMax access service network provided by a network access provider that provides a WiMax radio access infrastructure to WiMax network service providers.

Access service network 24 includes one or more base stations 32 and a gateway 36. A base station 32 represents any suitable device system that provides wireless services to a mobile node 20 present in, or visiting, a cell of base station 32. For example, base station 32 may represent an access location that couples a wireless network, such as a wireless radio network, to a wired network, such as a wide area network. A cell may refer to a geographic unit serviced by a base station 32.

Base station 32 may comprise suitable devices operable to provide wireless services to mobile nodes 20 present in a cell. According to one embodiment, base station 32 includes a base transceiver station and a base station controller. The base transceiver station communicates signals to and from mobile node 20 through a wireless link that is typically a radio frequency link. The base station controller manages the operation of the base transceiver station.

A gateway 36 represents a device operable to provide an interface to a network. Gateway 36 may perform any suitable operations. For example, gateway 36 may convert communications between different communication protocols. For example, gateway 36 may convert communications from a protocol used by network 28 to a different protocol, or vice-versa.

Gateway 36 of access service network 24 includes a foreign agent 44 of mobile node 20. Foreign agent 44 may represent an agent that provides home agent 48 with an address to which data from mobile node 20 may be forwarded.

According to one embodiment, foreign agent 44 may include an authenticator 52. Authenticator 52 may represent any suitable logic operable to authenticate registration requests from endpoints such as mobile node 20. Although authenticator 52 is shown as located at foreign agent 44, authenticator 52 may be located at any suitable location. For example, authenticator 52 may be located at any other suitable gateway 36.

According to the embodiment, authenticator 52 may obtain a mobility key that may be used to authenticate a registration request from mobile node 20. The mobility key may indicate that there is a secure association between mobile node 20 and foreign agent 44. For example, the mobility key may comprise a mobile node-foreign agent (MN-FA) key. Since authenticator 52 may authenticate a registration request from mobile node 20 with a mobility key, foreign agent 44 is not required to perform a foreign agent challenge operation for mobile node 20.

Connectivity service network 28 represents a communication network that provides mobility management for mobile node 20. Connectivity service network 28 may also provide other operations, for example, authorization operations, host configuration management operations, other operation, or any combination of the preceding. Connectivity service network 28 may be provided by a network service provider. A network service provider may refer to an entity that provides IP connectivity and WiMAX services to subscribers.

Connectivity service network 28 includes one or more gateways 36 and an authentication, authorization, and/or accounting (AAA) server 40. A gateway 36 of connectivity service network 28 includes a home agent 48 of mobile node 20. Home agent 48 may represent an agent that allocates the address of mobile node 20 and forwards packets to mobile node 20.

AAA server 44 may represent any suitable device operable to provide AAA-related services. AAA-related services may include services for authentication, authorization, accounting, or any suitable combination of the preceding. Authentication may refer to validating the identity of mobile node 20. Authorization may refer to authorizing a level of service for mobile node 20. Accounting may refer to tracking the usage of resources. As an example, an authorization server may provide one, two, or three of the listed services.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a block diagram illustrating one embodiment of an authenticator 52 that may be used with system 10 of FIG. 1. According to the embodiment, authenticator 52 includes a mobility key module 60 and an authentication engine 64.

According to one embodiment, mobility key module 60 may obtain a mobility key that may be used to authenticate a registration request from mobile node 20. During the performance of access/device authentication of mobile node 20, mobility keys may be generated. A X-Y key may be generated to perform an authentication procedure between element X and element Y. Example mobility keys may include a mobile node-gateway (MN-GW) key, a mobile node-AAA server (MN-AAA) key, a mobile node-foreign agent (MN-FA) key, and a mobile node-home agent (MN-HA) key. According to the embodiment, mobility key module 60 may obtain an MN-FA key A mobility key may be generated in any suitable manner. According to one embodiment, mobility keys may be derived from an extended master session key (EMSK) The derivation may be made according to any suitable application and cipher suite. For example, mobility keys may be derived according to a key derivation function applied to the master session key and other parameters such as application data.

According to one embodiment, AAA server 40 may derive the mobility keys from the extended master session key, and then distribute the mobility keys to appropriate network entities. For example, AAA server 40 may send the mobility key to authenticator 52 in a message indicating that the access authentication was successful. According to another embodiment, AAA server 40 may send the master session key to authenticator 52. Mobility key module 60 may derive the mobility key from the master session key.

Keys may be transmitted in any suitable manner. As an example, a key may be transmitted in a message that includes an encrypted copy of the key and an identifier identifying a procedure for decrypting the encrypted copy. Mobility key module 60 may then use the identified procedure for decrypting the encrypted copy.

According to one embodiment, authentication engine 64 may authenticate a registration request from mobile node 20 using the mobility key. Authentication engine 64 may send requests to mobile node 20, which sends responses to the requests. For example, authentication engine 64 may send an initial identity request followed by one or more requests for authentication information. Mobile node 20 may send responses that include an identifier and authentication information.

According to the embodiment, authenticator 52 may obtain a mobility key that may be used to authenticate a registration request from mobile node 20. The mobility key may indicate that there is a secure association between mobile node 20 and foreign agent 44. For example, the mobility key may comprise a mobile node-foreign agent (MN-FA) key. Since authenticator 52 may authenticate a registration request from mobile node 20 with a mobility key, foreign agent 44 is not required to perform a foreign agent challenge operation for mobile node 20.

Modifications, additions, or omissions may be made to authenticator 52 without departing from the scope of the invention. The components of authenticator 52 may be integrated or separated according to particular needs. Moreover, the operations of authenticator 52 may be performed by more, fewer, or other modules. Additionally, operations of authenticator 52 may be performed using any suitable logic.

FIG. 3 is a flowchart illustrating one embodiment of a method for authenticating a registration request from a mobile node that may be used with system 10 of FIG. 1. The method begins at step 110, where mobile node 20 registers with a wireless network. Mobile node 20 may register with access service network 24.

Access authentication is performed at step 114 to authenticate mobile node 20 for an IP network. Access authentication may refer authenticating a device to allow the device to access a network. As an example, mobile node 20 may be authenticated for connectivity service network 28. The access authentication may be performed using any suitable protocol, for example, the extensible authentication protocol (EAP).

Authenticator 52 obtains a mobility key from AAA server 40 at step 118. During the performance of access authentication, mobility keys may be generated. For example, an MN-FA key may be generated. According to one embodiment, AAA server 40 may derive an MN-FA key from an extended master session key, and then distribute the MN-FA key to appropriate network entities. According to another embodiment, AAA server 40 may send a master session key to authenticator 52. Authenticator 52 may derive the MN-FA key from the master session key.

A registration request is received from mobile node 20 at step 122. A registration request may comprise a mobile IP registration request (RRQ). Authenticator 52 authenticates the registration request with the mobility key at step 126. According to one embodiment, authenticator 52 may send requests to mobile node 20, which sends responses to the requests.

Since authenticator 52 may authenticate a registration request from mobile node 20 with a mobility key, authenticator 52 need not perform a foreign agent challenge. After authenticating the registration request, the registration request may be forwarded to home agent 48 at step 130. After forwarding the registration request, the method terminates.

An embodiment of the method may be detected in any suitable manner. For example, packets between authenticator 52 and AAA server 40 may be examined to determine if AAA server 40 provide authenticator 52 with a mobility key.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a mobility key may be used to authenticate a mobile node and a network, that is, the mobility key may be used to provide mutual authentication. Another technical advantage of one embodiment may be that an authenticator may authenticate a registration request using a mobility key provided to the authenticator. Accordingly, the authenticator need not perform a challenge procedure to authenticate the registration request.

Another technical advantage of one embodiment may be that the authenticator may be associated with a foreign agent. Accordingly, the registration request may be authenticated for a foreign network. Another technical advantage of one embodiment may be that the authenticator may be located at a gateway of an Internet Protocol (IP) network. Accordingly, the registration request may be authenticated for the IP network.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for authenticating a registration request from a mobile node, comprising:

facilitating at an authenticator a communication session for a mobile node;

facilitating access authentication to provide the mobile node access to an Internet Protocol (IP) network;

receiving, by the authenticator, a master session key generated from the access authentication of the mobile node, the master session key transmitted in a message comprising an encrypted copy of the master session key and an identifier identifying a procedure for decrypting the encrypted copy, the receiving the master session key from the access authentication further comprising receiving, at the authenticator, the master session key from an authentication server;

deriving, by the authenticator, a mobility key from the master session key;

receiving, by the authenticator, a registration request from the mobile node after deriving the mobility key;

authenticating, by the authenticator, the registration request using the mobility key; and forwarding, by the authenticator, the authenticated registration request to a home agent of the mobile node.

2. The method of claim 1, wherein facilitating the access authentication to provide the mobile node access to the IP network further comprises:

facilitating the access authentication performed according to an Extensible Authentication Protocol.

3. The method of claim 1, wherein the authenticator is associated with a foreign agent of the mobile node.

4. An authenticator operable to authenticate a registration request from a mobile node, comprising:

a memory operable to store information; and a processor coupled to the memory and operable to:

facilitate a communication session for a mobile node;

facilitate access authentication to provide the mobile node access to an Internet Protocol (IP) network;

receive a master session key generated from the access authentication of the mobile node, the master session key transmitted in a message comprising an encrypted copy of the master session key and an identifier identifying a procedure for decrypting the encrypted copy, the receiving the master session key from the access authentication further comprising receiving, at the authenticator, the master session key from an authentication server;

derive, by the authenticator, the mobility key from the master session key;

receive a registration request from the mobile node after deriving the mobility key;

authenticate the registration request using the mobility key; and forward the authenticated registration request to a home agent of the mobile node.

5. The authenticator of claim 4, the processor further operable to facilitate the access authentication to provide the mobile node access to the IP network by:

facilitating the access authentication performed according to an Extensible Authentication Protocol.

6. The authenticator of claim 4, wherein the authenticator is associated with a foreign agent of the mobile node.

7. One or more non-transitory data storage media storing logic for authenticating a registration request from a mobile node, the logic when executed by a computer operable to:

facilitate at an authenticator a communication session for a mobile node;

facilitate access authentication to provide the mobile node access to an Internet Protocol (IP) network;

receive, by the authenticator, a master session key generated from the access authentication of the mobile node, the master session key transmitted in a message comprising an encrypted copy of the master session key and an identifier identifying a procedure for decrypting the encrypted copy, the receiving the master session key from the access authentication further comprising receiving, at the authenticator, the master session key from an authentication server;

derive, by the authenticator, the mobility key from the master session key;

receive, by the authenticator, a registration request from the mobile node after deriving the mobility key;

authenticate, by the authenticator, the registration request using the mobility key; and forward, by the authenticator, the authenticated registration request to a home agent of the mobile node.

8. The data storage media of claim 7, the logic further operable to facilitate the access authentication to provide the mobile node access to the IP network by:

facilitating the access authentication performed according to an Extensible Authentication Protocol.

9. The data storage media of claim 7, wherein the authenticator is associated with a foreign agent of the mobile node.

* * * * *